Sept. 21, 1948. W. H. TANDET 2,449,916
COUPLING DEVICE
Filed Sept. 22, 1945
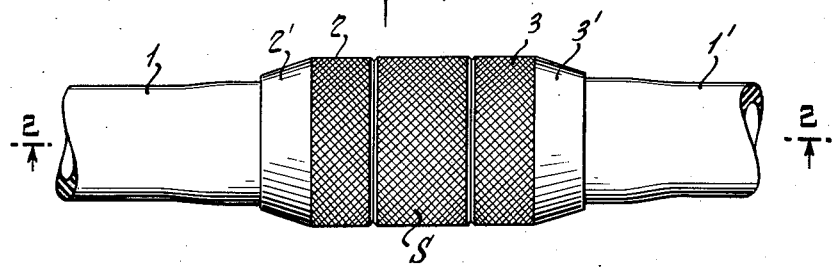
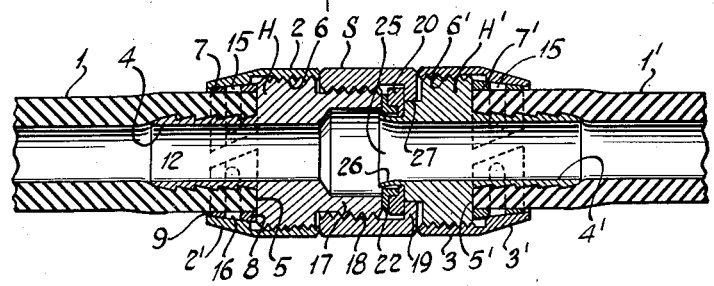
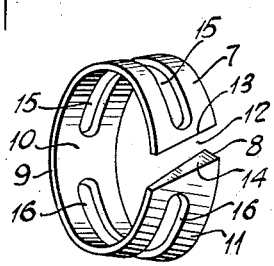
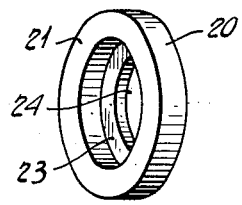
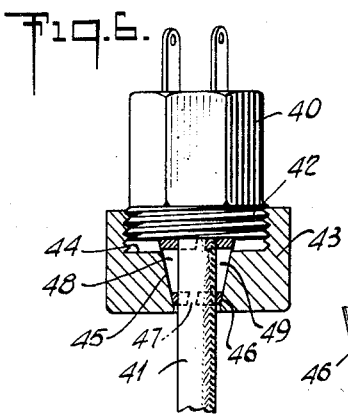
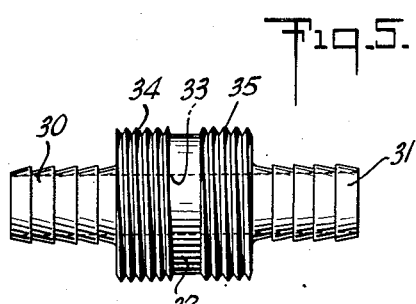
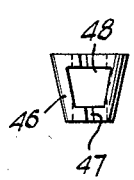
INVENTOR
WILLIAM H. TANDET.
BY
Abraham S. Greenberg
ATTORNEY Patented Sept. 21, 1948

2,449,916

UNITED STATES PATENT OFFICE 2,449,916

COUPLING DEVICE

William H. Tandet, Stamford, Conn.

Application September 22, 1945, Serial No. 617,982

1 Claim. (Cl. 285—86)

My present invention relates generally to coupling devices, and more particularly to improvements in hose or pipe coupling devices of the type utilizing internal compression rings.

An important object of my invention is to provide a coupling device having an internal compression ring which functions as a spring seal thereby to permit its ready use for all types of fluid lines.

Another important object of my invention is to provide a novel means for retaining a coupling sleeve on a female coupling head with free swivel action.

Another object of my present invention is to provide a novel dual nipple coupling unit adapted to receive coupling heads embodying the aforesaid novel compression rings.

Another object of my invention is to provide an adaptation of my aforesaid coupling head to an electric plug.

A more specific object of my present invention is to provide a hose or pipe connector having these following characteristics: a factor of safety above that of the hose itself; a joint which is dependably watertight at all pressures to which the hose shall be subjected; the manipulation of all elements, both in assembly and disassembly, shall require only manual labor with no reference to mechanical assistance.

In accordance with my invention I construct the internal compression rings, which are embodied in each coupling head, so that they positively grip the portion of the hose surrounded by the ring. Each internal compression ring is provided with at least one elongated opening which permits the surface of the hose to bulge into the opening as the compression ring is caused to compress the hose in response to adjustment of the coupling nut.

Still other objects of my invention are to improve generally the efficiency and action of hose or pipe coupling devices, and more particularly to provide an improved spring seal for coupling devices.

With the above objects in view and others which will be made more apparent as the description proceeds, the invention will now be more specifically set forth with reference being had to the accompanying drawing which forms a part of this application and in which:

Fig. 1 is a view of a coupling device provided with my invention, portions of the hose being shown as secured thereto;

Fig. 2 is a longitudinal and median section of the coupling device along line 2—2 looking in the direction of the arrows;

Fig. 3 is a perspective view of the internal split tapered ring;

Fig. 4 is a perspective view of the retaining ring for the coupling sleeve;

Fig. 5 shows a modified form of coupling head provided with opposed dual nipples and to which my invention is readily applied for coupling broken or cut hose or pipes;

Fig. 6 is a partly longitudinal and median section through a modified embodiment of my invention as applied to the wire of an electric plug; and Fig. 7 is a front view of the internal compression ring used in the device of Fig. 6.

Referring now more specifically to the drawing, wherein corresponding reference characters are used to designate similar parts in the different views, I have shown in Fig. 1 the external appearance of my coupling device applied to join the ends of rubber hose or other pipes. The hose 1, 1' may be separate lines, or they may be the free ends of a single line. In the latter case the coupling device may be separated into a female coupling head for attachment to a water outlet, and a male coupling head for attachment to a nozzle.

The male coupling head or plug H is provided with a binding member or nut 2 which has a knurled external surface over the cylindrical section thereof, while tapering rearwardly as at 2'. The female, or companion, coupling head or plug H' is provided with a binding member or nut 3 constructed in the same manner as nut 2. The nut 3, also, has a tapered rearward section 3'. In addition, the coupling head H' is provided with a female coupling sleeve S which is mounted thereon for free swivel motion. The external face of sleeve S is knurled. When sleeve S is screwed on to the male threaded plug H, the coupling device appears as in Fig. 1. The adjoining edges of nut 2, sleeve S and nut 3 are in close contact, and these elements have a common outside diameter, and are in axial alignment with the hose sections. While I prefer to fabricate all parts of the device from aluminum, it is to be understood that I do not restrict myself to that material.

Referring to Fig. 2 for the internal structure of the coupling device, each coupling head or plug H and H' is provided with a respective integral nipple 4 and 4' of any desired and suitable length and cross-sectional diameter. The external surfaces of the nipples are serrated, or provided with ridges, thereby to enlarge or spread the associated hose sections. The outside diameter of the coupling heads H and H' is greater than the outside diameter of the hose sections. The hose sections abut the shoulders 5, 5' of the coupling plugs. The plugs are in threaded engagement with the internally threaded binding nuts 2 and 3. In other words, the inner diameter of the cylindrical section of each binding nut 2 and 3 is equal to the outer diameter of plugs H and H'. Further, the threaded engagement between the nuts 2, 3 and the respective coupling heads is indicated by 6 and 6'.

A split ring, shown in detail in Fig. 3, surrounds and clasps the end of each hose section. The rings 7, 7' are elastic in that they can expand or contract depending upon whether pressure is removed therefrom or applied. Each ring is adapted to be slipped over the end of the hose before the nipple is inserted, and is then distended and forced over the nipple so as to clasp the end portion of the hose as shown in Fig. 2. It will be seen that the shoulders 5, 5' act as stops for the forward or front edges 8 of the rings.

Each ring is located wholly between the conoidal section 2' and 3' of the nuts 2 and 3 and the clasped hose ends, as shown in Fig. 1. Each ring is tapered or conoidal towards its rear edge 9; the inner face 10 of the ring being of constant diameter while the outer face 11 is tapered. Hence, each ring functions as an annular wedge and compression ring. The split or cut 12 is provided at an angle, as shown in Fig. 3. There is a substantial space between the opposite ends of the cut ring. The space is of such dimension that a complete contraction of the ring will not usually occur in operation. However, the cut is sufficiently non-radial to permit the ends 13 and 14 to ride upon each other should complete contraction occur.

The rings are, furthermore, provided with spaced elongated openings 15 and 16. These openings or slots are located in opposition, and act to augment to a great extent the grip of the sealing or compression rings on the ends of the hose. As the rings are compressed or contracted against the hose ends, there is a tendency for the material to bulge or work into the opposed slots 15 and 16. An extremely effective and positive seal is thereby created by the rings.

The binding nuts 2 and 3 are adapted to have the respective tapered rear sections 2' and 3' thereof function as the pressure applying elements for the rings 7, 7'. Each binding nut has an internal diameter which is larger than the outside diameter of the forward edge 8 of the ring. The rear sections 2' and 3' of the respective nuts have rearward internal conoidal, or annular beveled, faces which are adapted to slidably engage the tapered faces of the rings 7, 7'. In Fig. 2 I have shown the preferred dimensional relation between the tapered faces of the compression rings 7, 7' and the coacting internal rearwardly tapered faces of nut sections 2' and 3'.

It will now be seen that as the binding nuts 2 and 3 are respectively moved forward into threaded engagement as at 6 and 6', the internal bevel faces of sections 2' and 3' ride upon the exterior tapered faces of the respective rings 7, 7' so that the latter are caused to contract and compress the hose end around the respective nipples 4, 4'. Concurrently the material of the hose in alignment with the slots 15 and 16 begins to bulge into the latter thereby to cause a highly effective seal.

In accordance with a further aspect of my invention I provide a novel and simplified mode of swiveling the sleeve S on the coupling head H'. The function of sleeve S is to provide threaded engagement between the externally threaded flange 17 and the internally threaded sleeve S. The threaded engagement between flange 17 and sleeve S is denoted by numeral 18. I prefer to have the bore of flange 17 of larger diameter than the bore provided through the rearward portion of head H and nipple 4. The bore of flange 17 is, also, larger than the bore H' and nipple 4'. The sleeve S is provided with rear restraining rim 19 located between the stop disc 20 and the forward shoulder 21 of coupling plug H'.

In Fig. 4 I have shown a detail of the stop disc or ring 20. The forward face 21 thereof is adapted to be covered by any suitable washer 22. Washer 22 may be made of rubber. The disc 20 is, furthermore, provided with an internal shoulder 23 to provide a seat for the rear face of washer 22. The forward face of washer 22 is adapted to be contacted by the forward edge of flange or nose 17 when the latter is in threaded engagement with sleeve S. Hence, washer 22 provides a watertight seal.

The disc 20 is provided with central inner opening 24 whose diameter is equal to the outer diameter of the forward tubular extension 25 of the coupling head H'. The extension 25 has both the disc 20 and seated washer 22 mounted thereon. The rear opening of sleeve S is fitted over a ledge or shelf 27 located between the shoulder 21 of head H' and the tubular extension 25, as shown in Fig. 2. The sleeve S is able to swivel freely on the shelf 27, the disc 20 preventing forward motion of the sleeve. The disc 20 is itself prevented from shifting forwardly by peening the end 26 of the tubular extension 25. The peened end 26 may be provided in any suitable manner. The essential thing is to expand the end 26 sufficiently to fix the disc 20 against the forward face of ledge or shelf 27. Hence, sleeve S functions as the female coupling element of the coupling head H'.

To disassemble the coupling device from the position shown in Fig. 1, it is only necessary to rotate sleeve S in a direction to unscrew the latter from the flange or boss 17. When this is done the sleeve S may be screwed on to an externally threaded fluid outlet (say a water outlet as in a garden), while a nozzle having an internal rear thread may be screwed on to the threaded flange or boss 17. It is assumed that the hose 1, 1' is one continuous hose in that case. On the other hand, the coupling device may be the unit employed to connect separate sections of hose or pipe.

To assemble the elements of the coupling device the following procedure is followed. The binding nuts 2 and 3 are placed over the sections of the hose 1, 1' to be joined. These nuts are moved back along the hose sections to allow the split tapered rings 7, 7' to be placed in position at the end of each respective hose section 1, 1'. The nipple 4 of plug H is then inserted into the end of hose 1 and the nipple 4' of plug H' is inserted into the end of the other hose 1'. The nuts 2 and 3 are then drawn over the respective split tapered rings to the position of the exposed sections of the plugs, and are screwed forward onto the threads provided for them on both plugs. In accomplishing this action several things occur. As the nuts 2, 3 are drawn gradually forward over the threads provided for them on both plugs, the taper inside of the nuts is brought to bear upon the split tapered rings. Since the split tapered rings cannot move forward due to the wall of the plug provided for that purpose, the split tapered ring is forced to contract, and in so doing creates a pressure between the plug and the nut. The bulge of the hose material into slots 15, 16 takes place. It is this pressure and action of ring slots which secures the hose section to the plug, and produces a seal effecting a watertight joint. The plugs, having been secured, are then connected together by means of the sleeve S which, being mounted on a swivel on the plug H', is able to be screwed onto the thread provided for it on the plug H. The sleeve S is screwed until the nose 17 of the plug H has seated itself securely against the rubber washer 22 which is provided for that purpose.

In Fig. 5 I have shown a modified coupling or connected unit adapted to be used with my binding nuts 2 and 3 and the respective rings 7 and 7'. The connector is provided with dual ridged nipples 30 and 31 extending in opposite directions from the central coupling head 32. A common central fluid passage or bore 33 is provided. The head 33 is provided with spaced threaded sections 34 and 35 to receive the respective theaded binding nuts 2 and 3. To use this coupling head to join a pair of hose sections, the nipples 30 and 31 are inserted into the ends of the hose sections, as shown in Fig. 2. The respective rings 7 and 7' are then positioned over the ends of the hose sections as shown in Fig. 2, and the binding nuts 2 and 3 are finally screwed on to the respective threaded sections 34 and 34' thereby to cause compression by the rings.

The binding nut and associated tapered split ring may be applied to an electric connection, if desired. In Fig. 6 the numeral 40 denotes any suitable electric plug, as used for wall sockets for example, and the numeral 41 designates an insulated wire connected to the plug. To protect the surface of the wire 41 from fraying, and otherwise degenerating, at the vicinity of the entrance to the plug 40, I provide a rear threaded section 42 on the plug 40. A binding nut 43, provided with a forward internal threaded bore 44, is adapted to be screwed to the threaded section 42.

The bore 44 has a narrower rearward tapering bore 45 through which the wire 41 is passed. The wire 41 is surrounded and clasped by the split sleeve 46 whose construction is generally similar to the split tapered ring shown in Fig. 3. The split tapered sleeve 46 is provided with a linear internal diameter, but has an external bevel or taper adapted to coact with the rearward taper of bore 45. The cut 47 permits the sleeve to contract as the nut 43 is screwed on the threaded plug 40. The opposed openings 48 and 49 are provided to augment the grip of sleeve 46 on the insulation covering of wire 41. The action here is much the same as described for slots 15, 16 of Fig. 3. In Fig. 7 there is shown a detailed view of the tapered sleeve construction.

It will be clear that my invention is capable of modification in details of construction and arrangement, and is adapted to be used in connection with other types of coupling units, so that I do not desire to be limited to the specific embodiments shown herein.

What I claim is:

In a swivelled coupling sleeve for a coupling head of the type comprising a plug having an external thread and an internal bore, said plug having a forward tubular extension of said bore; the improvement comprising a disc axially mounted on said extension, said sleeve having a rearward rim located between said disc and the body of the plug, said disc being provided with an internal shoulder thereby to provide a washer seat, a washer fitted in said seat, and the forward end of said tubular extension being expanded in diameter to prevent forward motion of the disc and fitted washer.

WILLIAM H. TANDET.

REFERENCES CITED

The following references are of record in the file of this patent:

UNITED STATES PATENTS

| Number | Name | Date |
|--------|------|------|
| 145,731 | Edson | Dec. 23, 1873 |
| 1,096,503 | Gibbs | May 12, 1914 |
| 1,233,401 | Reeve | July 17, 1917 |

FOREIGN PATENTS

| Number | Country | Date |
|--------|---------|------|
| 427,650 | France | Aug. 9, 1911 |